United States Patent [19]
Glass et al.

[11] 3,812,613
[45] May 28, 1974

[54] EDUCATIONAL FIGURE TOY

[75] Inventors: Marvin I. Glass, Chicago; Jeffrey D. Breslow, Highland Park; Eugene Jaworski, Park Ridge, all of Ill.

[73] Assignee: Marvin Glass & Associates, Chicago, Ill.

[22] Filed: May 17, 1972

[21] Appl. No.: 253,952

[52] U.S. Cl. .................................. 46/119, 46/135
[51] Int. Cl. ........................................... A63h 11/00
[58] Field of Search .................. 46/135, 119; 35/17

[56] References Cited
FOREIGN PATENTS OR APPLICATIONS
58,861   12/1953   France .............................. 46/119

*Primary Examiner*—Louis G. Mancene
*Assistant Examiner*—J. Q. Lever
*Attorney, Agent, or Firm*—Coffee & Sweeney

[57] ABSTRACT

An educational doll which simulates pregnancy including a torso of generally self-supporting material having a yieldable abdominal portion and a plunger movably mounted in the interior of the torso and engageable with exterior drive means for moving the plunger into engagement with, and extending the yieldable abdominal portion of, the torso of the doll.

7 Claims, 7 Drawing Figures

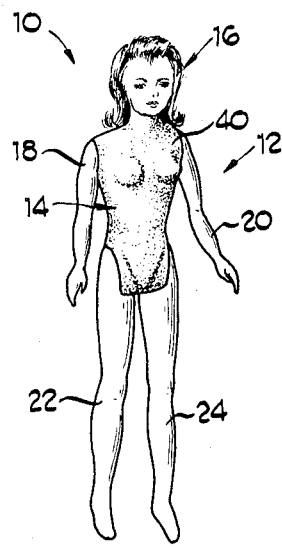
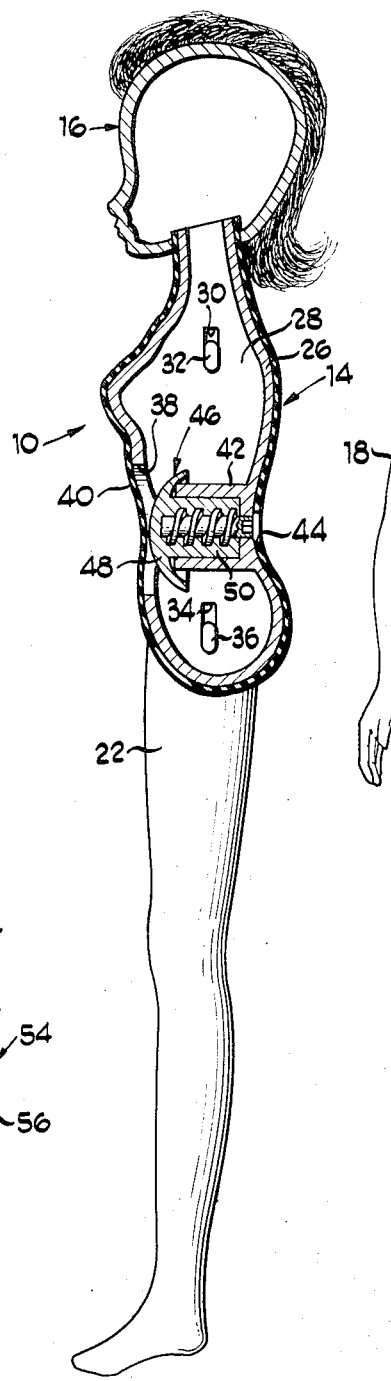
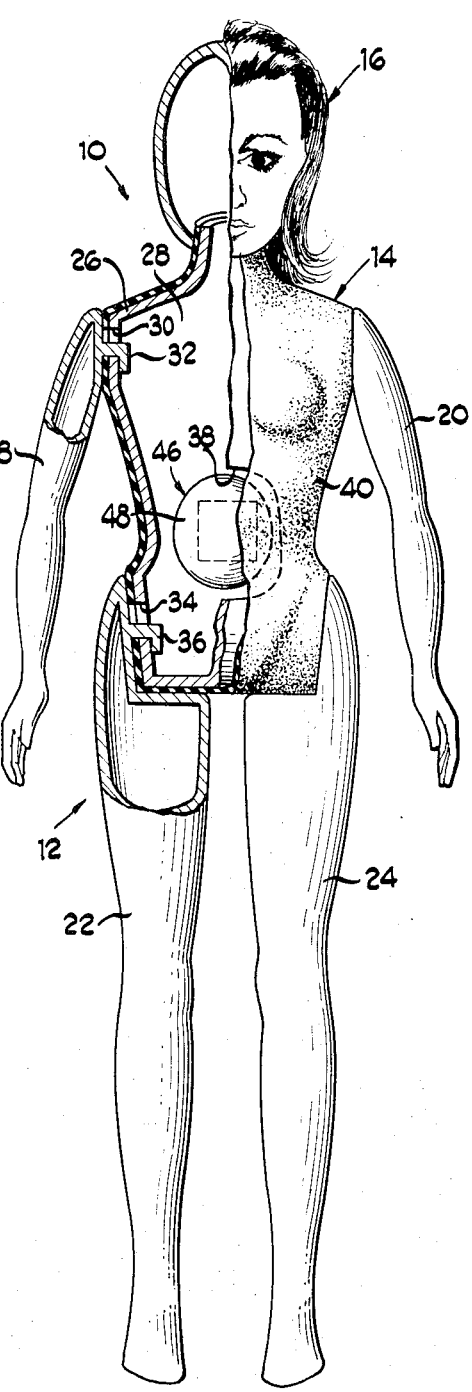
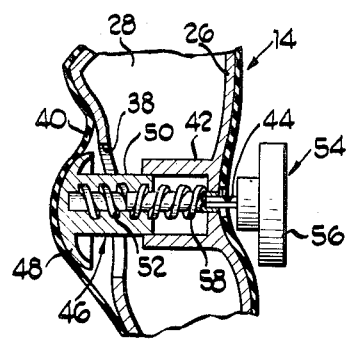

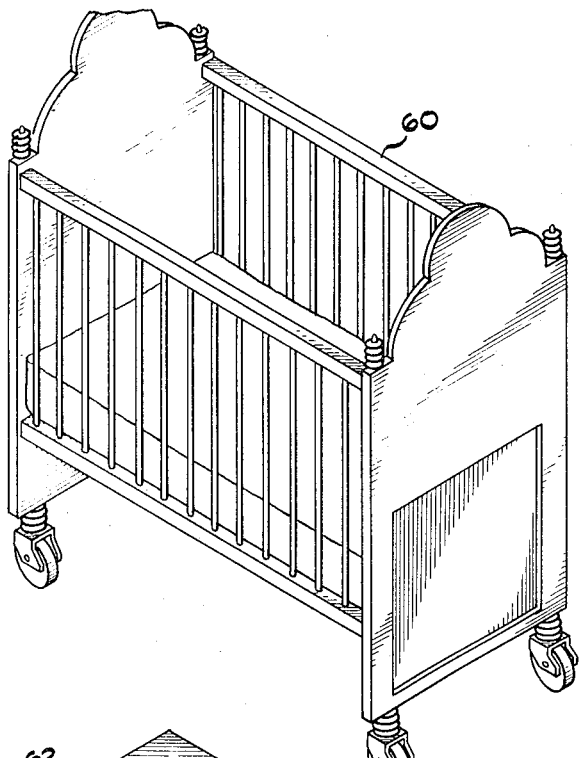
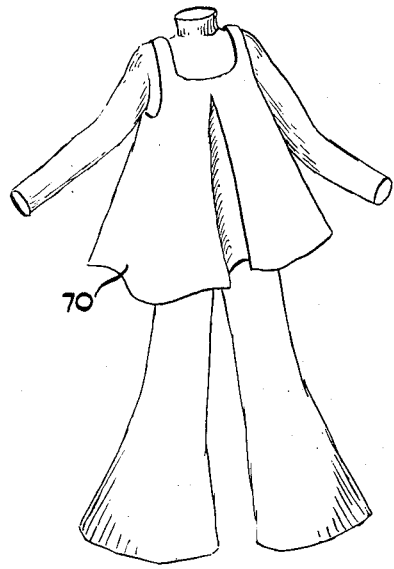
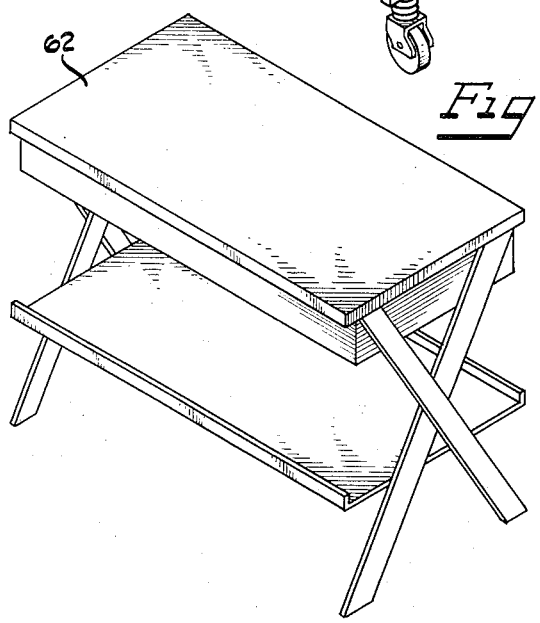
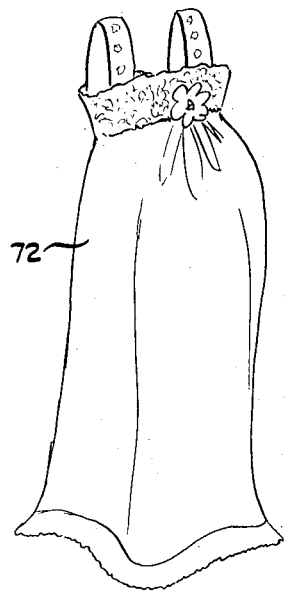
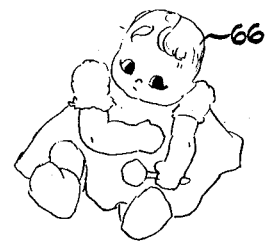
Fig 5
Fig 7
Fig 6

EDUCATIONAL FIGURE TOY

BACKGROUND OF THE INVENTION

This invention relates to educational dolls.

BRIEF DESCRIPTION OF THE PRIOR ART

In the art relating to play and educational dolls, there has been an increasing number of dolls which simulate different human activities. In addition, in recent years there has been an increasing use of dolls in an educational manner. One form of use of dolls for educational purposes is that which would simulate functions of an adult or simulate conditions in an environment in which the user or child finds itself.

Dolls which simulate activities of adults are especially popular in that the user of the doll may transpose himself into an adult stage of sharing activities with the doll during the functioning or simulated activities of the doll. To applicants' knowledge, the provision of dolls which simulate impending maternity has almost been non-existent. Related prior art dolls known to the applicants include the following: Pearson U.S. Pat. Nos. 2,548,237, Graves 2,551,433 and Wood et al., 2,572,795.

It is the object of this invention to meet the continuing need and desire in the art for improvements in educational toys and dolls by providing a doll which may undergo physical or configuration changes to simulate different stages of pregnancy.

SUMMARY OF THE INVENTION

This invention is directed, in brief, to the provision of an improved doll which may simulate stages of pregnancy.

The best mode currently contemplated for carrying out the invention includes the provision of the doll having a torso portion of a substantially rigid self-supporting material but, with an interruption in the abdominal portion covered by a yieldable skin portion. The interior of the abdomen has a screw driven plunger which may move into engagement with the yieldable abdominal portion and distend the same to change the configuration of the doll to one of a pregnancy simulation. In addition, a driving tool in the form of a screw member engageable with the plunger is provided for moving the plunger between retracted and extended positions for changing the abdominal configuration of the doll.

BRIEF DESCRIPTION OF THE DRAWINGS

FIG. 1 is a perspective view of the doll of this invention.

FIG. 2 is a section view of the doll of this invention showing the plunger member in a retracted state wherein the abdominal portion of the doll is of a normal configuration.

FIG. 3 is a front view of the doll partially broken away in section; and

FIG. 4 is a fragmentary view through the doll torso showing the plunger member in an extended position, with the abdominal portion of the doll distended to simulate a state of full pregnancy.

FIG. 5 is a perspective view showing different accessories which may be utilized with the doll of this invention;

FIG. 6 is a further perspective view showing different accessories in the form of small child-like dolls which may be further utilized with the doll of this invention; and FIG. 7 is a further perspective view showing simulated maternity clothing which may be also utilized with the doll of this invention in a simulated pregnancy state.

BRIEF DESCRIPTION OF THE PREFERRED EMBODIMENT

The doll 10 of this invention includes a body 12, comprised of a torso portion, generally indicated 14, a head 16, and arms 18 and 20 and legs 22 and 24.

Preferably, the torso 14 is comprised of a rigid self-supporting shell 26 which may be of a suitable plastic or similar material. The interior of the shell 26 defines a hollow interior 28. An arm slot 30 is provided at the upper end of each side of the body for receiving each right angular arm tab 32 to secure the arm to the body. Similarly, leg slots 34 are provided at each side of the lower portion of the torso for receiving each right angular leg tabs 36 to secure the legs 22 and 24 to the body as well.

The shell 26 is interrupted as at 38, in the abdominal area. Preferably, the entire body shell or torso portion 14 is covered with a yieldable skin simulating material 40, such as a yieldable or resilient vinyl material or the like. In the area of the interruption 38, this yieldable material 40 is the only covering of the torso 14. It is to be understood that the sheet material 40 does not have to cover the entire torso or body, but only that area which overlies the interruption 38 of the abdomen portion of the torso.

The doll of this invention is provided with a means for extending the abdominal portion of the yieldable material. 40. Included in this means is a cylindrical sleeve 42 which extends from the interior of the rear wall of the torso generally opposite the interruption 38 with the sleeve serving a function as a guide means. A small opening 44 is formed generally coaxial with the sleeve 42, and extends through the rear wall of the torso and provides a passage way communicating with the exterior of the torso. Further included in the means for extending the abdominal portion is a closure means comprising the button-like head 48 and the shank 50 which is of a size and shape to closely mate with the interior of the sleeve or guide means 42. Shank 50 has a hollow interior defining a threaded bore 52 which affords a driving surface for receiving a like driving surface of a driving means, here shown in the form of a threaded member 58. The threaded member 58 is rotatably mounted within sleeve 42. Shank 50 is non-rotatably received within sleeve 42 within a square bore shown in dotted lines in FIG. 3.

A screw member 54 has a reduced end portion opposite a disc-like head 56. The reduced end portion is non-rotatably engageable through opening 44 with the threaded member 58.

In operation, the screw member 54 may be engaged through opening 44 with threaded member 58. Then by rotating the screw head 56, the plunger 46 will be advanced due to the driving interaction between the threaded member 58 and threaded bore 52. This provides a means for moving the plunger to different positions which means includes the passageway in the torso between the plunger and the torso exterior and the drive means comprising the screw member and the threaded shank 58 engageable with the plunger threaded bore 52. Generally speaking, the plunger is moveable to and fro in the torso interior between a retracted position, as shown in FIG. 2, wherein the plunger is slightly spaced away from the abdominal portion of yieldable material; through movement where the plunger may engage and distend the yieldable abdominal portion, and to a further extended position, as shown in FIG. 4, wherein the yieldable abdominal portion is fully extended, simulating a state of advanced pregnancy. It can be seen that the plunger may be advanced by a selected distance to simulate different stages of pregnancy and may be fully retracted when desired to simulate conditions following delivery.

It is intended that the doll 10 of this invention could be utilized with related accessories to assist in the educative and imitative process. The doll 10 would be intended to be illustrative of a mother about to expect a child. Thus, it is intended that a crib and bathinet accessory 60 and 62, could be provided for use with the doll. In addition, as shown in FIG. 6, one or two children 64 and 66 could also be provided in doll-like form such as the small child 64 and the infant child 66. The implements are shown in FIG. 5 and 6 greatly assist the child in identifying in a family situation, particularly, if the child's own mother has gone through stages of pregnancy. As further shown in FIG. 7, it is intended that maternity dresses 70 or 72, could also be provided for use with the doll, thus as the doll's configuration is changed to indicate advanced stages of pregnancy, the user or participant could dress the doll 10 in one of the maternity dresses 70 or 72.

Thus it can be seen that the doll 10 of this invention provides an improvement in dolls which are both educational and imitative of adult activities. With the doll of this invention, the user or participant may alter the configuration of the doll so as to simulate the different stages of pregnancy. The altered configuration is selectively variable by the user, and, may be used to imitate the conditions in a relative, such as the child's mother. The accessory implements are provided so as to environmentalize the condition of the doll with other common surroundings, such as the crib, bed and other children as the case may be. Also, clothes are provided so as to complete the simulation of pregnancy. The means for altering the configuration of the doll is relatively very simple, yet provides an excellent means for planting an identification in the mind of the user of the physical changes involved in the stages of pregnancy.

The foregoing detailed description has been given for clearness of understanding only, and no unnecessary limitations should be understood therefrom, as some modifications may be obvious to those skilled in the art.

We claim:

1. An educational doll comprising: means defining a doll torso including a shell of generally rigid self-supporting structure enclosing an interior, and a yieldable abdominal portion;

means for extending said abdominal portion including a plunger member mounted in the torso interior for movement toward and away from the yieldable abdominal portion, said movement including movement from a retracted position through at least one intermediate position wherein said plunger engages and distends the yieldable abdominal portion, to a fully extended position wherein said yieldable abdominal portion is fully extended, said plunger having a threaded bore;

means for guiding movement of said plunger through said positions including a passageway in the torso communicating between the plunger and the torso exterior;

and drive means accessible through the passageway including a screw member having a threaded shank which is engageable with the plunger threaded bore to selectively move the plunger to and fro in the torso interior.

2. The doll of claim 1 including guide means for the plunger in the interior of the torso with the passageway in the torso communicating with the guide means.

3. The doll of claim 2 wherein said torso shell has an interruption in the abdominal area thereof and a yieldable sheet-like member covers said interruption to provide said yieldable abdominal portion.

4. The doll of claim 3 wherein the guide means comprises a generally cylindrical sleeve in the interior of the torso having an open end facing in opposition to said torso shell interruption.

5. The doll of claim 4 wherein the plunger has a generally cylindrical shaft of a size and shape to be matingly received within said sleeve and guided thereby.

6. The doll of claim 5 wherein said passageway opens to the interior of said sleeve.

7. The doll of claim 6 wherein the plunger has a generally spherical segmental head connected to said threaded bore and facing in opposition to the torso shell interruption.

* * * * *